(12) United States Patent
Yamada

(10) Patent No.: US 6,983,070 B2
(45) Date of Patent: Jan. 3, 2006

(54) METHOD AND APPARATUS FOR PROCESSING IMAGE DATA AND A RECORDING MEDIUM LOADED WITH A PROGRAM FOR EXECUTING THE METHOD

(75) Inventor: Makoto Yamada, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 546 days.

(21) Appl. No.: 09/988,634

(22) Filed: Nov. 20, 2001

(65) Prior Publication Data

US 2002/0090145 A1 Jul. 11, 2002

(30) Foreign Application Priority Data

Nov. 20, 2000 (JP) .............................. 2000-352671

(51) Int. Cl.
*G06K 9/00* (2006.01)
*G06K 9/32* (2006.01)
(52) U.S. Cl. ....................................... 382/167; 382/299
(58) Field of Classification Search ................ 382/167, 382/220, 221, 289, 298, 299
See application file for complete search history.

(56) References Cited

U.S. PATENT DOCUMENTS 6,631,204 B1 * 10/2003 Smith .......................... 382/130
6,711,291 B1 * 3/2004 Stubler et al. .............. 382/195

OTHER PUBLICATIONS

Francisco H. Imai, et al. ,"High-Resolution Multi-Spectral Image Archives: A Hybrid Approach", IS & T/SID Sixth Color Imaging Conference: Color Science, Systems, and Applications, pp. 224-227, 1998.

* cited by examiner

*Primary Examiner*—Amelia M. Au
*Assistant Examiner*—Wes Tucker
(74) *Attorney, Agent, or Firm*—Sughrue Mion, PLLC

(57) ABSTRACT

The method and apparatus for processing image data create a third image of large pixel number and large channel number by combining two images obtained by photographing an identical subject, a first image being of large pixel number and small channel number and a second image being of small pixel number and large channel number. The method and apparatus perform principal component analysis on the image data in a specified region including a point in the second image which corresponds to a pixel of interest at a specified point in the first image, determine coefficients in linear sums so that the linear sums of a specified number of principal component vectors obtained by the principal component analysis render output values of the pixel of interest in the first image and determine spectral information of said pixel of interest based on the coefficients to create the third image. The recording medium is loaded with a program for executing the above method.

10 Claims, 2 Drawing Sheets

METHOD AND APPARATUS FOR PROCESSING IMAGE DATA AND A RECORDING MEDIUM LOADED WITH A PROGRAM FOR EXECUTING THE METHOD

BACKGROUND OF THE INVENTION

This invention relates to a method and an apparatus for processing image data and a recording medium loaded with a program for executing the method. The invention particularly relates to the technology of processing spectral image data to achieve satisfactory color reproduction of the original image.

An increasing number of museums are adopting digital archives in which artwork is recorded and stored in digital form. Conventionally, most of the artworks have been recorded and stored by silver halide photography. However, silver halide photography does not necessarily assure exact color reproduction and the result is often influenced by the illuminating light source. To overcome these problems, an increasing use is being made of a multi-band camera that can acquire the spectral information of the original image. The multi-band camera is a camera that captures the image of a subject using narrow-band filters to separate the visible range into several sub-regions and which reconstructs the spectral information of each pixel from the respective images.

Imaging by the conventional multi-band camera is based on the combination of interference filters with a silver halide photographic camera and the image on a film is captured with a scanner or the like to provide a digital format and the individual images are brought into registry before getting the spectral information of each point (pixel). However, bringing a plurality of images into exact registry is by no mean easy and the quality of the final image is often sacrificed.

On the other hand, information of the original image can be directly digitized by a CCD camera and if the camera is fixed, the individual images need not be brought into registry and the subsequent data processing can be simplified. Because of this advantage, the CCD camera is increasingly used today as an imaging device.

However, CCD cameras capable of capturing a large number of pixels are very costly and even high-end models are limited in pixel number. As a matter of fact, very few multi-band cameras using a CCD camera feature more than a million pixels. This is by no means adequate for archival purposes and it has been desired to develop a multi-band camera that can acquire a satisfactory number of pixels.

According to the method described in IS&T/SID Sixth Color Imaging Conference: Color Science, Systems, and Applications, 224–227, 1998, only luminance information is acquired from a silver halide photographic camera and combined with the color information from a multi-band camera, thereby producing a high-definition spectral image. However, this method still involves the cumbersome operation of bringing the image from a silver halide photographic camera into exact registry with the image from a multi-band camera.

SUMMARY OF THE INVENTION

The present invention has been accomplished under these circumstances and has as a first object providing a method for image data processing in which a high-definition image as from a silver halide photographic camera is combined with a low-resolution multi-band image to produce a high-definition spectral image easily without the cumbersome register step.

A second object of the invention is to provide an apparatus for implementing the method.

A third object of the invention is to provide a recording medium loaded with a program for executing the method.

In order to attain the first object described above, the first aspect of the present invention provides a method of processing image data in which two images obtained by photographing an identical subject, a first image being of large pixel number and small channel number and a second image being of small pixel number and large channel number, are combined to create a third image of large pixel number and large channel number, the method comprising the steps of: performing principal component analysis on the image data in a specified region including a point in the second image of small pixel number and large channel number which corresponds to a pixel of interest at a specified point in the first image of large pixel number and small channel number; determining coefficients in linear sums so that the linear sums of a specified number of principal component vectors obtained by the principal component analysis render output values of the pixel of interest in the first image of large pixel number and small channel number; and determining spectral information of the pixel of interest based on the coefficients to create the third image of large pixel number and large channel number.

Preferably, the first image of large pixel number and small channel number is an image that has been taken with a silver halide photographic camera and then captured with a scanner, and the second image of small pixel number and large channel number is an image captured with a low-resolution multi-band camera.

In order to attain the second object described above, the second aspect of the present invention provides an apparatus for processing image data in which two images obtained by photographing an identical subject, a first image being of large pixel number and small channel number and a second image being of small pixel number and large channel number, are combined to create a third image of large pixel number and large channel number, the apparatus comprising: means for performing principal component analysis on the image data in a specified region including a point in the second image of small pixel number and large channel number which corresponds to a pixel of interest at a specified point in the first image of large pixel number and small channel number; means for determining coefficients in linear sums so that the linear sums of a specified number of principal component vectors obtained by the principal component analysis render output values of the pixel of interest in the first image of large pixel number and small channel number; and means for determining spectral information of the pixel of interest based on the coefficients to create the third image of large pixel number and large channel number.

Preferably, the first image of large pixel number and small channel number is an image that has been taken with a silver halide photographic camera and then captured with a scanner, and the second image of small pixel number and large channel number is an image captured with a low-resolution multi-band camera.

In order to attain the third object described above, the third aspect of present invention provides a recording medium loaded with a program for executing the method according to the first aspect of the present invention.

DESCRIPTION OF THE PREFERRED EMBODIMENT

The image data processing method and apparatus of the invention and the recording medium loaded with a program for executing the method are described below in detail with reference to the preferred embodiment shown in the accompanying drawings.

Figure 1:
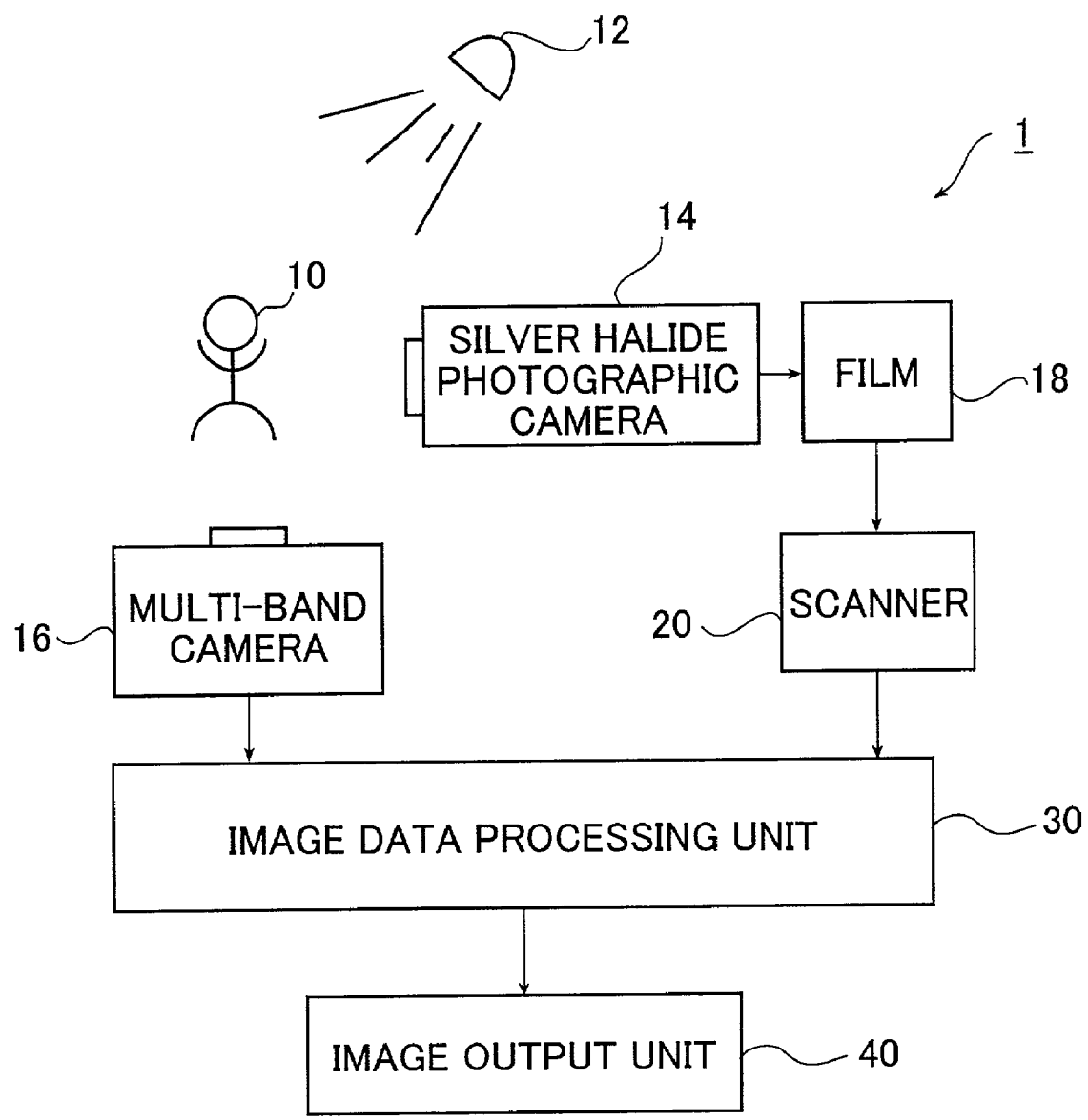
FIG. 1 is a block diagram outlining an embodiment of an image reproducing system that incorporates an image data processing apparatus of the invention.

FIG. 1 is a block diagram outlining an embodiment of an image reproducing system that incorporates the image data processing apparatus of the invention. As shown, the image reproducing system generally indicated by 1 has a subject 10 imaged with a silver halide photographic camera (which means conventional optical camera for capturing an image of the subject on a silver halide photographic film such as a negative film and a reversal film) 14 and a multi-band camera 16, optionally under illumination with a light source 12, and the obtained images are input as digital image data into an image data processing unit 30, where they are subjected to specified image data processing steps to create a high-definition spectral image that is output as a duplicated image from an image output device 40.

The image on a film 18 that has been taken and developed with the silver halide photographic camera 14 is captured with a scanner 20 and input into the image data processing unit 30 as digital image data (silver halide photographic image data). The multi-band camera 16 uses a CCD camera and the image captured with this camera is directly input into the image data processing unit 30 as digital image data (multi-band image data). The cameras that can be used are not limited to any particular types.

In the embodiment under discussion, PENTAX Z-5P of ASAHI OPTICAL CO., LTD. was used as the silver halide photographic camera 14 and Super G ACE 400 of Fuji Photo Film Co., Ltd. was used as the light-sensitive material. To scan the film after development, CELSIS 6200 of Fuji Photo Film Co., Ltd. was used as scanner 20. The resulting image had 2700×2700 pixels and each pixel had three channels R, G and B.

In the embodiment under discussion, multi-band camera 16 was available from Fuji Photo Film Co., Ltd. and comprises a CCD camera portion, a spectral filter assembly and a personal computer. The CCD camera was CA-D4-1024A, PCI I/F of DALSA, Inc. which was monochromatic and featured 1024×1024 pixels each measuring 12×12 $\mu$m. The spectral filter assembly was Varispec Tunable Filter RS232C I/F which was the liquid-crystal tunable filter of CRI, Inc.; the center wavelength was adjustable to a desired value as chosen from the range of 400–720 nm; wavelength's width at half maximum was 30 nm; the transmittance was 6–60% (dependent on wavelength). The personal computer was Book type PC (Windows 95) c++ of PROS-IDE, Inc.; CPU was operating at 166 MHz; RAM had a capacity of 128 Mbytes.

By imaging the subject with this multi-band camera 16, spectral image having 1024×1024 pixels for 16 channels is obtained as data (digital data) for 16 wavelengths (channels) and the obtained digital image data is input to the image data processing unit 30.

Figure 2:
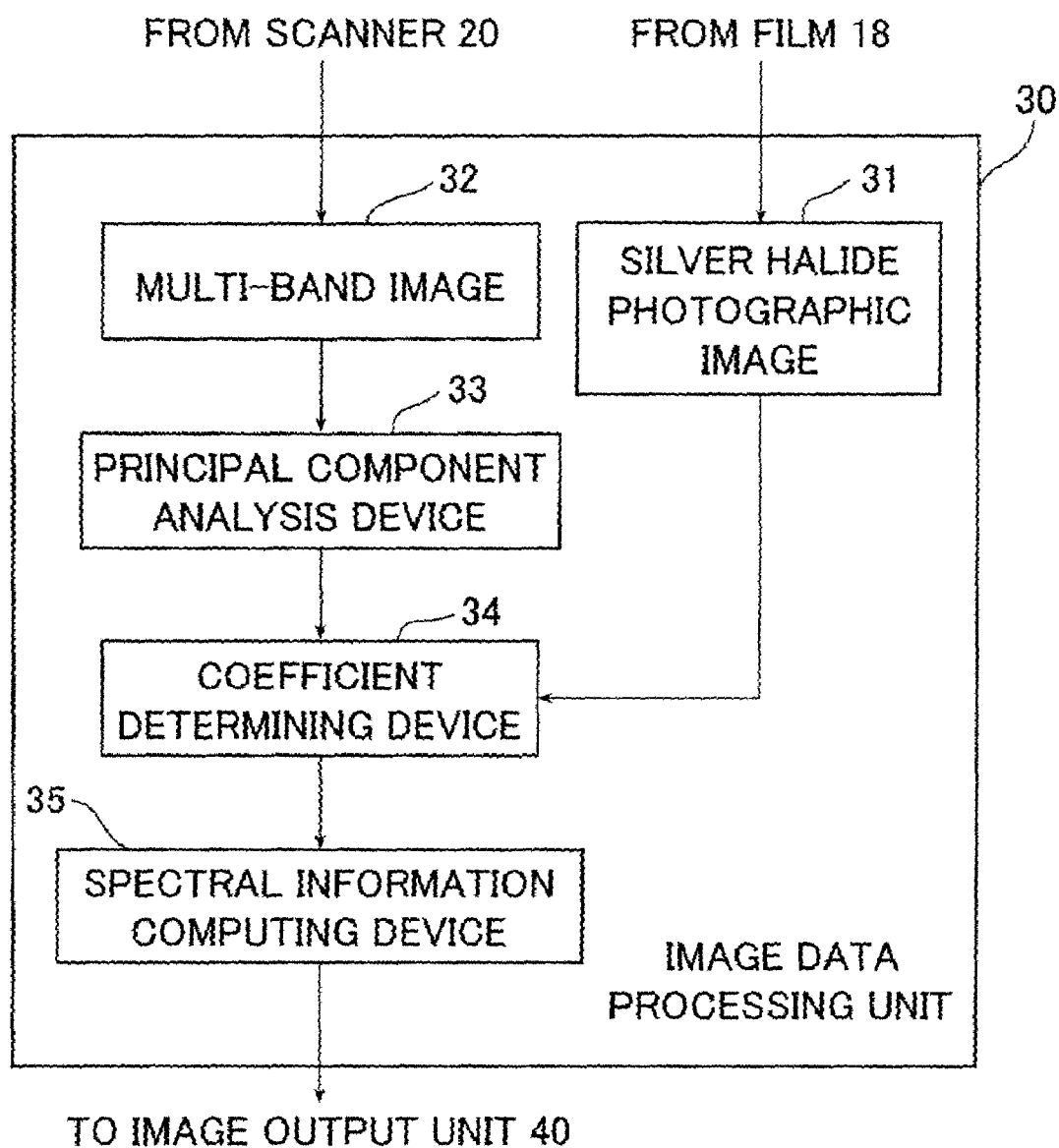
FIG. 2 is a block diagram outlining the configuration of an image data processing apparatus according to an embodiment of the invention.

FIG. 2 outlines an embodiment the configuration of the image data processing unit 30 shown in FIG. 1. As shown, the silver halide photographic image data and the multi-band image data that have been input into the image data processing unit 30 are stored in memories 31 and 32, respectively. Other components of the image data processing unit 30 are a principal component analysis device 33, a coefficient determining device 34 and a spectral information computing device 35.

As already mentioned, the silver halide photographic image data is digital image data having 2700×2700 pixels for 3 channels, and the multi-band image data is digital image data having 1024×1024 pixels for 16 channels. Hence, it can be said that the silver halide photographic image data presents an image of larger pixel number but smaller channel number than the multi-band image data; on the other hand, the multi-band image data presents an image of smaller pixel number but larger channel number than the silver halide photographic image data.

In the embodiment under discussion, the image data processing unit 30 performs the following operations: it first performs principal component analysis on image data of a specified region including a point in the multi-band image data of small pixel number and large channel number that corresponds to a pixel of interest in the silver halide photographic image data of large pixel number and small channel number; using the linear sums of the principal component vectors obtained by the principal component analysis, the amounts of exposure are expressed in such a way that they coincide with the amounts of exposure of the pixel of interest in said silver halide photographic image data; finally, using the coefficients in the linear sums, the spectral information of said pixel of interest is computed to create an image of large pixel number and large channel number.

To be more specific, the principal component analysis means 33 selects a certain point in the silver halide photographic image data as a pixel of interest, takes a specified region including the corresponding single point in the multi-band image data, retrieves the data within the specified region from the memory 32, and performs principal component analysis on the retrieved data. By principal component analysis, first, second and third principal component vectors v1, v2 and v3 are determined.

In the embodiment under discussion, the size of the specified region in the multi-band image data is 50×50 pixels with the center pixel being the single point corresponding to the pixel of interest. Preferably, this region is at least of a size that allows for principal component analysis and may be so large that the cumulative percent contribution of up to the third principal component exceeds a certain value. A more preferred region contains a sufficient number of pixels that the cumulative percent contribution of up to the third principal component is 90% or more and this enables more precise reproduction of spectral reflectance.

Suppose here that the spectral reflectances of the subject can be approximated by the first through third principal component vectors v1–v3 obtained as the result of principal component analysis. In the coefficient determining device 34, the amounts of exposure ER', EG' and EB' of the light-sensitive material can be calculated as the output values of the pixel of interest by the following equations (1)–(3) using the linear sums of v1–v3 which contain $\alpha$, $\beta$ and $\gamma$ as coefficients:

$$ER' = \Sigma[P(n) \cdot SR(n) \cdot \{\alpha \cdot v1(n) + \beta \cdot v2(n) + \gamma \cdot v3(n)\}] \quad (1)$$

$$EG' = \Sigma[P(n) \cdot SG(n) \cdot \{\alpha \cdot v1(n) + \beta \cdot v2(n) + \gamma \cdot v3(n)\}] \quad (2)$$

$$EB' = \Sigma[P(n) \cdot SB(n) \cdot \{\alpha \cdot v1(n) + \beta \cdot v2(n) + \gamma \cdot v3(n)\}] \quad (3)$$

wherein P(n) represents the distribution of the illumination, SR(n), SG(n) and SB(n) represent the spectral sensitivities of the R, G and B layers, respectively, in a color negative film, and the sum $\Sigma$ is taken for n channels (n=16).

Described below is the method of determining the coefficients $\alpha$, $\beta$ and $\gamma$. Substituting the following equations (4)–(12), the equations (1)–(3) can be transformed to the following equation (13). In each of the equations (4)–(12), the sum $\Sigma$ is taken for n channels (n=16).

$$a = \Sigma[P(n) \cdot SR(n) \cdot v1(n)] \quad (4)$$

$$b = \Sigma[P(n) \cdot SR(n) \cdot v2(n)] \quad (5)$$

$$c = \Sigma[P(n) \cdot SR(n) \cdot v3(n)] \quad (6)$$

$$d = \Sigma[P(n) \cdot SG(n) \cdot v1(n)] \quad (7)$$

$$e = \Sigma[P(n) \cdot SG(n) \cdot v2(n)] \quad (8)$$

$$f = \Sigma[P(n) \cdot SG(n) \cdot v3(n)] \quad (9)$$

$$g = \Sigma[P(n) \cdot SB(n) \cdot v1(n)] \quad (10)$$

$$h = \Sigma[P(n) \cdot SB(n) \cdot v2(n)] \quad (11)$$

$$i = \Sigma[P(n) \cdot SB(n) \cdot v3(n)] \quad (12)$$

$$\begin{pmatrix} ER' \\ EG' \\ EB' \end{pmatrix} = \begin{pmatrix} a & b & c \\ d & e & f \\ g & h & i \end{pmatrix} \begin{pmatrix} \alpha \\ \beta \\ \gamma \end{pmatrix} \quad (13)$$

Solving equation (13) for $\alpha$, $\beta$ and $\gamma$, we can obtain the following equation (14):

$$\begin{pmatrix} \alpha \\ \beta \\ \gamma \end{pmatrix} = \begin{pmatrix} a & b & c \\ d & e & f \\ g & h & i \end{pmatrix}^{-1} \begin{pmatrix} ER' \\ EG' \\ EB' \end{pmatrix} \quad (14)$$

On the basis of the silver halide photographic image data stored in the memory 31, the amounts of exposure ER, EG and EB received by the R, G and B layers, respectively, in response to R, G and B digital signals for the pixel of interest are computed with reference to three-dimensional look-up tables that show the relationship between the amount of exposure and color density which has been preliminarily determined by laser exposure. Substituting the computed amounts of exposure ER, EG and EB into the amounts of exposure ER', EG' and EB' in equation (14), the coefficients $\alpha$, $\beta$ and $\gamma$ are determined by the following equation (15):

$$\begin{pmatrix} \alpha \\ \beta \\ \gamma \end{pmatrix} = \begin{pmatrix} a & b & c \\ d & e & f \\ g & h & i \end{pmatrix}^{-1} \begin{pmatrix} ER \\ EG \\ EB \end{pmatrix} \quad (15)$$

If the coefficients $\alpha$, $\beta$ and $\gamma$ in the linear sums of the principal component vectors are thusly determined, the amounts of exposure which are the output values of the pixel of interest in the silver halide photographic image data can be expressed in terms of the principal component vectors and the spectral reflectances of each point can be estimated with high precision.

The spectral information computing device 35 uses the thus determined coefficients $\alpha$, $\beta$ and $\gamma$ to compute the spectral information R(n) for the pixel of interest in the silver halide photographic image data of large pixel number and small channel number by using the following equation (16):

$$R(n) = \alpha \cdot v1(n) + \beta \cdot v2(n) + \beta \cdot v3(n) \quad (16)$$

where n represents the number of channels and ranges from 1 to 16.

By repeating these operations for all points in the silver halide photographic image data, one can obtain an image of large pixel number and large channel number that has 2700×2700 pixels for 16 channels.

The thus obtained image of large pixel number and large channel number is optionally subjected to other image processing steps before it is output from the image output device 40 as a duplicated image.

A program for executing the above-described image data processing method may be loaded into a specified recording medium and this provides great convenience since the same image data processing as described in the embodiment under consideration can be executed in various systems.

Thus, in the embodiment described above, the silver halide photographic camera is combined with the small-pixel-number and low-resolution multi-band camera to create the high-definition spectral image without the cumbersome register step.

The multi-band camera employed in the above embodiment uses a CCD camera but this is not the sole case of the invention and any types of multi-band camera may be employed as long as they low resolution. The terms "large pixel number", "small pixel number", "large channel number" and "small channel number" as used herein have only relative meanings that depend on case. Usually, the "small channel number" refers to three channels R, G and B. Four or more channels may be referred to as the "large channel number". As for the pixel number, about a million or fewer pixels are usually referred to as the "small pixel number" and more than a million, preferably more than three million, pixels may be referred to as the "large pixel number".

While the image data processing method and apparatus of the invention and a recording medium loaded with a program for executing the method have been described above in detail, it should be understood that the invention is by no means limited to the foregoing embodiment and various improvements and alterations can be made without departing from the scope and spirit of the invention.

As described on the foregoing pages, a high-definition spectral image of large pixel number and large channel number can easily be produced by the present invention in which a high-definition image represented by image data of large pixel number and small channel number is combined with a low-resolution image represented by image data of small pixel number and large channel number.

What is claimed is:

1. A method of processing image data in which two images obtained by photographing an identical subject, a first image being of large pixel number and small channel number and a second image being of small pixel number and large channel number, are combined to create a third image of large pixel number and large channel number, said method comprising the steps of:

performing principal component analysis on the image data in a specified region including a point in said second image of small pixel number and large channel number which corresponds to a pixel of interest at a specified point in said first image of large pixel number and small channel number;

determining coefficients in linear sums so that said linear sums of a specified number of principal component vectors obtained by said principal component analysis render output values of said pixel of interest in said first image of large pixel number and small channel number; and determining spectral information of said pixel of interest based on said coefficients to create said third image of large pixel number and large channel number.

2. The method according to claim 1, wherein said first image of large pixel number and small channel number is an image that has been taken with a silver halide photographic camera and then captured with a scanner, and said second image of small pixel number and large channel number is an image captured with a low-resolution multi-band camera.

3. An apparatus for processing image data in which two images obtained by photographing an identical subject, a first image being of large pixel number and small channel number and a second image being of small pixel number and large channel number, are combined to create a third image of large pixel number and large channel number, said apparatus comprising:

means for performing principal component analysis on the image data in a specified region including a point in said second image of small pixel number and large channel number which corresponds to a pixel of interest at a specified point in said first image of large pixel number and small channel number;

means for determining coefficients in linear sums so that said linear sums of a specified number of principal component vectors obtained by said principal component analysis render output values of said pixel of interest in said first image of large pixel number and small channel number; and means for determining spectral information of said pixel of interest based on said coefficients to create said third image of large pixel number and large channel number.

4. The apparatus according to claim 3, wherein said first image of large pixel number and small channel number is an image that has been taken with a silver halide photographic camera and then captured with a scanner, and said second image of small pixel number and large channel number is an image captured with a low-resolution multi-band camera.

5. A computer readable recording medium loaded with a program for executing a method of processing image data in which two images of an identical subject, a first image being of large pixel number and small channel number and a second image being of small pixel number and large channel number, are combined to create a third image of large pixel number and large channel number, said method comprising the steps of:

performing principal component analysis on the image data in a specified region including a point in said second image of small pixel number and large channel number which corresponds to a pixel of interest at a specified point in said first image of large pixel number and small channel number;

determining coefficients in linear sums so that said linear sums of a specified number of principal component vectors obtained by said principal component analysis render output values of said pixel of interest in said first image of large pixel number and small channel number; and determining spectral information of said pixel of interest based on said coefficients to create said third image of large pixel number and large channel number.

6. The computer readable recording medium according to claim 5, wherein said first image of large pixel number and small channel number is an image that has been taken with a silver halide photographic camera and then captured with a scanner, and said second image of small pixel number and large channel number is an image captured with a low-resolution multi-band camera.

7. The method according to claim 1, wherein the small channel number comprises three or less channels.

8. The method according to claim 1, wherein the small pixel number comprises a million or less pixels.

9. An apparatus for processing image data in which two images obtained by photographing an identical subject, a first image being of large pixel number and small channel number and a second image being of small pixel number and large channel number, are combined to create a third image of large pixel number and large channel number, said apparatus comprising:

a principal component analyzer operable to perform principal component analysis on the image data in a specified region including a point in said second image of small pixel number and large channel number which corresponds to a pixel of interest at a specified point in said first image of large pixel number and small channel number;

a coefficient determiner operable to determine coefficients in linear sums so that said linear sums of a specified number of principal component vectors obtained by said principal component analysis render output values of said pixel of interest in said first image of large pixel number and small channel number; and a spectral information determiner operable to determine spectral information of said pixel of interest based on said coefficients to create said third image of large pixel number and large channel number.

10. The method according to claim 1, wherein the coefficients in linear sums are determined with reference to a three-dimensional look up table according to a relationship between an amount of exposure and color density for the pixel of interest.

* * * * *